United States Patent [19]
Ross

[11] 3,734,269
[45] May 22, 1973

[54] ROD CONVEYOR CLEATS

[75] Inventor: Earl W. Ross, La Canada, Calif.

[73] Assignee: Tatch-A-Cleat Products, Pasadena, Calif.

[22] Filed: Mar. 20, 1972

[21] Appl. No.: 235,978

[52] U.S. Cl. ................................................198/197
[51] Int. Cl. ..............................................B65g 15/30
[58] Field of Search.....................198/195, 197, 198, 198/199

[56] References Cited

UNITED STATES PATENTS

| | | | |
|---|---|---|---|
| 2,649,954 | 8/1953 | Nawman | 198/198 |
| 2,809,742 | 10/1957 | Holz | 198/199 |
| 3,045,809 | 7/1962 | Bechtel | 198/195 |
| 3,559,796 | 2/1971 | Marks | 198/198 |
| 2,981,401 | 4/1961 | Cummings | 198/195 |
| 2,796,972 | 6/1957 | Jeffras | 198/176 |

FOREIGN PATENTS OR APPLICATIONS 6,409,966 3/1965 Netherlands..........................198/198

*Primary Examiner*—Richard E. Aegerter
*Attorney*—Luc P. Benoit

[57] ABSTRACT

A conveyor cleat releasably attachable to a rod conveyor has a cleat blade for retaining goods during conveyance, a cleat base attached to the cleat blade base, and a pair of flexible lips for releasably retaining adjacent conveyor rods. The lips are integral with the cleat base and define rod-receiving channels which have channel openings facing in a direction opposite to the direction of travel of the conveyor cleat. The lips also provide the corresponding channels with closed channel bottoms located ahead of the corresponding conveyor rod as seen in the direction of travel of the cleat.

The cleats according to the subject invention are easily and economically manufactured, preferably by extrusion, are readily attached to rod conveyors without the use of any special tools or clamping devices, securely maintain themselves in position during travel, and are nevertheless easily removed after use without disassembly or prolonged downtime of the conveyor.

7 Claims, 3 Drawing Figures

Patented May 22, 1973 3,734,269

ROD CONVEYOR CLEATS

BACKGROUND OF THE INVENTION

1. Field of the Invention

The subject invention relates to conveyors and, more particularly, to cleats or rod conveyors.

2. Description of the Prior Art

Rod conveyors are well known in the conveyor field. Typically, they comprise a large number of rods which are linked together by hooks formed at both ends of each rod.

Rod conveyors are frequently preferred over belt conveyors because of their rugged construction and their capability of separating dirt or other contaminants from the goods during conveyance.

As in the case of belt conveyors, it is also frequently desirable to provide rod conveyors with cleats for retaining the goods during conveyance. In the past, attempts have been made to satisfy this need by adapting conveyor belt cleats to rod conveyor systems. This at best has only been successful in connection with small or specialized rod conveyor systems.

For instance, prior-art rod conveyor cleats which used clamping devices were cumbersome to install and had a tendency to collapse backwards as the conveyor moved about its endless path. Adjustable clamps which were designed to attach each cleat to two adjacent rods were too expensive and complicated and would work themselves loose during operation of the conveyor.

A prior-art snap-on elastomer cleat was at best able to handle small loads and would readily be detached by heavier loads or rugged service. In consequence, manufacturers of rod conveyors resigned themselves to either omit all cleats or then to vulcanize each cleat directly on a conveyor rod. Omission of cleats placed design and utility restrictions on the conveyor. Cleats which have been directly vulcanized onto conveyor rods were distorted in practice and relatively soon started to tear at the edges thereby necessitating replacement.

Replacement of cleats which had been vulcanized onto conveyor rods was particularly cumbersome since it necessitated a disassembly of the conveyor for a replacement of the particular rod.

SUMMARY OF THE INVENTION

A principal object of my invention is to provide cleats for rod conveyors which obviate the above mentioned disadvantages.

Another object of my invention is to provide cleats which are readily attached to rod conveyors without special tools or extraneous fastening devices, and which will still securely retain themselves on the conveyor during its operation.

It is a further object of my invention to provide cleats of the latter type that may readily be detached from rod conveyors without disassembly or undue downtime of the conveyor system.

A yet further object of my invention is to provide cleat stock that can readily be cut by the user or installer to any desired length prior to attachment to rod conveyors.

My invention broadly resides in a conveyor cleat releasably attachable to a rod conveyor having a plurality of rods for conveying goods. According to the invention, this conveyor cleat comprises, in combination, a cleat blade for retaining goods during conveyance, a cleat base attachable to the cleat blade for supporting the cleat blade, a first flexible lip integral with the cleat base for releasably retaining a first conveyor rod, and a second lip integral with the cleat base and defining with the cleat base a second channel for receiving a second conveyor rod located adjacent the first conveyor rod.

Further according to my subject invention, the cleat blade has a front surface facing in a direction of travel of the conveyor when the cleat is attached to the conveyor. The above mentioned first lip and the cleat base define a first channel for receiving the first conveyor rod. This first channel is located below the cleat blade and behind the above mentioned front surface as seen in the direction of travel. The first lip and the cleat base further define for the first channel a channel opening facing in a direction opposite to the direction of travel. Moreover, the first lip provides the mentioned first channel with a closed channel bottom located ahead of the first conveyor rod as seen in the direction of travel when the cleat is attached to the conveyor.

Still according to my subject invention, the above mentioned second channel is located behind the first channel as seen in the direction of travel, and the second lip and the cleat base define for the second channel a channel opening facing in a direction opposite to the direction of travel of the cleat.

In accordance with a preferred embodiment of my subject invention, the second lip provides the above mentioned second channel with a closed channel bottom located ahead of the second conveyor rod as seen in the direction of travel when the cleat is attached to the conveyor. In accordance with another preferred embodiment of the invention, the cleat comprises a one-piece profiled extrudate providing the cleat blade, cleat base and first and second lips. An extrudate is an article of manufacture produced by extrusion.

BRIEF DESCRIPTION OF THE DRAWINGS

My subject invention and its objects will become readily apparent from the following detailed description of preferred embodiments thereof, illustrated by way of example in the accompanying drawings, in which.

Like reference numerals in the drawings designate like or functionally equivalent parts.

DESCRIPTION OF PREFERRED EMBODIMENTS

Figure 1:
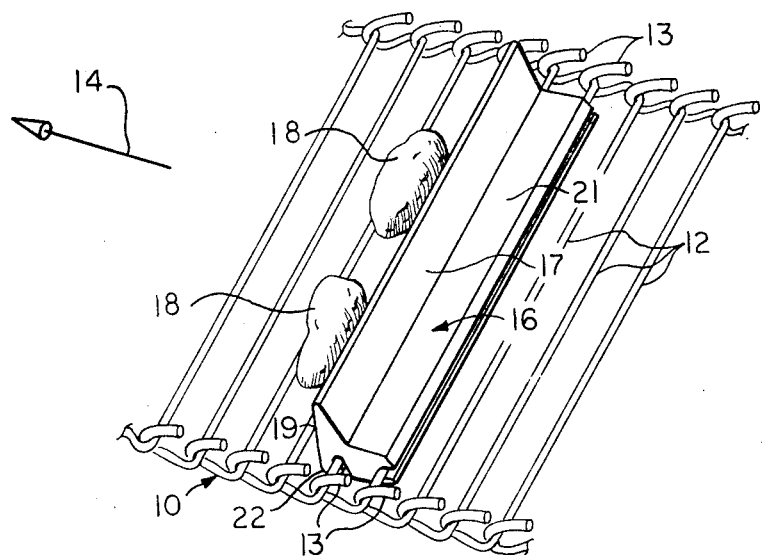
FIG. 1 is a perspective view of a portion of a rod conveyor having attached thereto a cleat in accordance with a preferred embodiment of the subject invention.

The rod conveyor of which a portion is shown in FIG. 1 may be of a conventional design. Rod conveyors are frequently used in agriculture for conveying produce. During such conveyance, pieces of soil adhering to the produce are shaken loose and can fall through the spaces between the rods. If desired, rod conveyors may also be used in mining or in various manufacturing processes.

In accordance with customary practice, the rod conveyor comprises a plurality of spaced parallel rods 12. The rods are linked together by hooks 13 which are provided by appropriate bends at both ends of the rods 12. Two adjacent rods 12 are shown in cross section and on a somewhat enlarged scale in FIG. 2.

Figure 2:
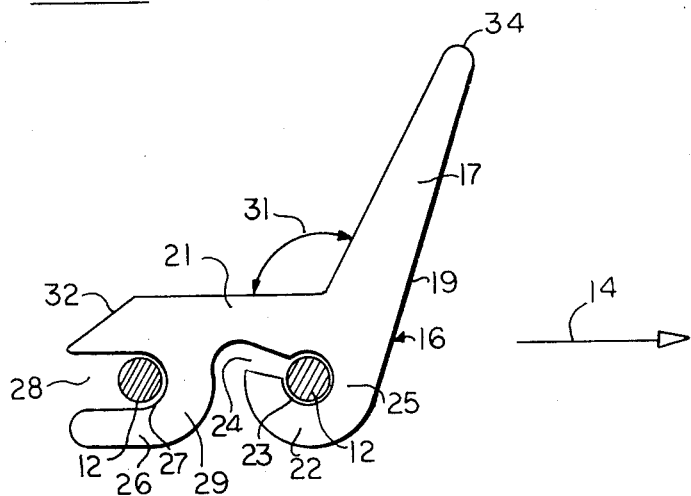
FIG. 2 is a side view of a cleat in accordance with a preferred embodiment of the subject invention, and a section through two adjacent rods of a rod conveyor.

In practice, a conveyor drive (not shown) advances the conveyor in the direction of travel indicated in FIGS. 1 and 2 by an arrow 14.

A cleat 16 in accordance with a preferred embodiment of the subject invention is shown attached to two adjacent rods 12. The cleat 16 has a cleat blade 17 for retaining goods 18 during conveyance. The cleat blade 17 has a front surface 19 facing in the direction of travel 14 of the conveyor when the cleat is attached to the conveyor. In practice, the front surface 19 is engaged by goods 18 abutting against the cleat blade 17.

The cleat 16 has a base 21 attached to the cleat blade 17 for supporting the cleat blade. The cleat base 21 extends substantially parallel to a plane through adjacent rods 12. The cleat base 21 is integral with the cleat blade 17.

A first flexible lip 22 is integral with the cleat base and releasably retains a first one of the two conveyor rods shown in FIG. 2. The one conveyor rod which in FIG. 2 is shown to the right of the other conveyor rod will for reference purposes be designated as the first conveyor rod, while the other conveyor rod will be designated as second conveyor rod.

The first lip 22 and the cleat base 21 define a first channel 23 for receiving the first conveyor rod. The first channel 23 is located below the cleat blade 17 and behind the front surface 19 as seen in the direction of travel 14.

The lip 22 and the cleat base 21 further define for the first channel 23 a channel opening 24 facing substantially in a direction opposite to the direction of travel 14. According to the subject invention, the first lip 22 provides the first channel 23 with a closed channel bottom 25 located ahead of the first conveyor rod as seen in the direction of travel 14.

A second lip 26 is integral with the cleat base 21 and defines with the cleat base a second channel 27 for receiving the second conveyor rod located adjacent the first conveyor rod and behind such first conveyor rod.

The second channel 27 is accordingly located behind the first channel as seen or considered in the direction of travel. The second lip 26 and the cleat base 21 define for the second channel 27 a channel opening 28 facing in a direction opposite to the direction of travel 14. In accordance with the illustrated preferred embodiment, the second lip 26 provides the second channel 27 with a closed channel bottom 29 located ahead of the second conveyor rod as seen in the direction of travel 14.

In accordance with a preferred embodiment of the subject invention, the cleat blade 17 and the cleat base 21 subtend an obtuse angle 31 as shown in FIG. 2. Tests have shown that this will maximize the retention of goods as well as the retention of the cleat on the conveyor.

In accordance with a preferred embodiment of the subject invention, the cleat 16 comprises a one-piece profiled extrudate which provides the cleat blade, cleat base and first and second lips. The cleat 16 may be extruded natural or synthetic rubber or elastomer. By way of example, suitable elastomers, such as ethylene propylene diene ter-polymer elastomer, are commercially available for the manufacture of cleats which will give extended outdoor service.

Figure 3:
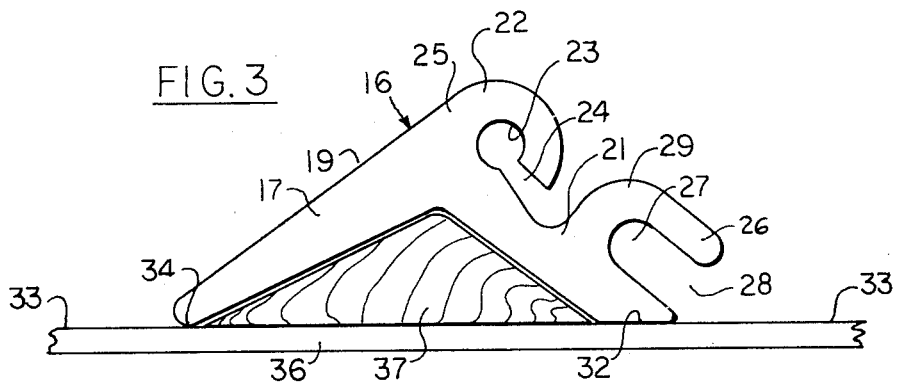
FIG. 3 is a side view, partially in section, of a cleat of the type shown in FIG. 2 and of part of the equipment for curing the cleat.

In accordance with a further preferred embodiment of the subject invention, the cleat base 21 has a sloped edge 32. As can be seen in FIG. 3, the sloped edge 32 extends substantially in a plane 33 which touches a top portion 34 of the cleat blade 17. In FIG. 3, the plane 33 is the top surface of a table 36 on which the extruded cleat 16 is placed with the aid of a support 37 during curing of the extruded cleat. In accordance with conventional practice, the cleat may be cured or vulcanized with suitable equipment (not shown) while in the position shown in FIG. 3.

Due to the presence of the sloped edge 32, the weight of the cleat is adequately supported and a distortion of the cleat is successfully avoided during a curing thereof. In practice, it may be found that the sloping angle of the edge 32 may change itself somewhat from the illustrated position as the cleat hardens.

The cleat 16 is attached to the conveyor by inserting the channel 27 with channel opening 28 over the second conveyor rod. This insertion is easily effected because of the generally U-shaped cross section of the channel 27. The channel 23 is then opened up by bending the flexible lip downwardly (or, in other words, by stretching the flexible lip). This operation may be performed directly by hand or with the aid of a suitable tool, such as a large screwdriver (not shown). The cleat is then swung downwardly and the stretched lip 22 is released so that it moves in position about the conveyor rod as shown in FIG. 2.

In practice, several cleats according to the subject invention are attached to the rod conveyor. By way of example, the spacing between adjacent cleats may be of the order of 1 foot. In practical operation, the interesting fact has been noted that forces occurring on the cleat during operation of the rod conveyor tend to move the flexible lip 22 upwardly in intimate contact with the rod 12 located in the channel 23. At the same time, the generally U-shaped channel 27 permits tolerances in the pitch between the two adjacent rods to which the cleat is attached.

After use, the cleat is easily detached by stretching the flexible lip 22 and removing the cleat from the conveyor rods. No disassembly of the conveyor rods and no prolonged work stoppage is necessary for a removal or replacement of cleats.

It will now be recognized that the subject invention meets the above mentioned objects and provides superior cleats for use with rod conveyors. While specific embodiments have been disclosed herein, various modifications and variations within the spirit and scope of the subject invention will become apparent or suggest themselves to those skilled in the art.

I claim:

1. A conveyor cleat releasably attachable to a rod conveyor having a plurality of rods for conveying goods, comprising in combination:

a cleat blade for retaining goods during conveyance, the cleat blade having a front surface facing in a direction of travel of the conveyor when the cleat is attached to the conveyor;

a cleat base attached to the cleat blade for supporting the cleat blade;

a first flexible lip integral with the cleat base for releasably retaining a first conveyor rod, the first lip and the cleat base defining a first channel for receiving the first conveyor rod, the first channel being located below the cleat blade and behind said front surface as seen in said direction of travel, the first lip and the cleat base further defining for the first channel a channel opening facing substantially in a direction opposite to said direction of travel, and the first lip providing the first channel with a closed channel bottom located ahead of said first conveyor or rod as seen in said direction of travel when the cleat is attached to the conveyor; and a second lip integral with the cleat base and defining with the cleat base a second channel for receiving a second conveyor rod located adjacent the first conveyor rod, the second channel being located behind the first channel as seen in said direction of travel, and the second lip and the cleat base defining for the second channel a channel opening facing in a direction opposite to said direction of travel.

2. A conveyor cleat as claimed in claim 1, comprising:
a one-piece profiled extrudate providing the cleat blade, cleat base and first and second lips.

3. A conveyor cleat as claimed in claim 2, wherein:
the cleat base has a sloped edge extending substantially in a plane touching a top portion of the cleat blade.

4. A conveyor cleat as claimed in claim 1, wherein:
the cleat blade and the cleat base subtend an obtuse angle.

5. A conveyor cleat as claimed in claim 1, wherein:
the second lip and the cleat base provide the second channel with a U-shaped cross-section.

6. A conveyor cleat as claimed in claim 1, wherein:
the second lip provides the second channel with a closed channel bottom located ahead of the second conveyor rod as seen in said direction of travel when the cleat is attached to said conveyor.

7. A conveyor cleat as claimed in claim 6, wherein:
the cleat blade and the cleat base subtend an obtuse angle.

* * * * *